(12) United States Patent
Lim et al.

(10) Patent No.: US 10,978,768 B2
(45) Date of Patent: Apr. 13, 2021

(54) BATTERY SYSTEM

(71) Applicants: HYUNDAI MOTOR COMPANY, Seoul (KR); KIA MOTORS CORPORATION, Seoul (KR)

(72) Inventors: Hae Kyu Lim, Bucheon-si (KR); Jun Seok Choi, Suwon-si (KR); Yong Hwan Choi, Yongin-si (KR); Jeong Hun Seo, Suwon-si (KR); Jae Hoon Hoi, Gunpo-si (KR); Yong Jin Lee, Yongin-si (KR)

(73) Assignees: Hyundai Motor Company, Seoul (KR); Kia Motors Coporation, Seoul (KR)

( * ) Notice: Subject to any disclaimer, the term of this patent is extended or adjusted under 35 U.S.C. 154(b) by 25 days.

(21) Appl. No.: 16/671,033

(22) Filed: Oct. 31, 2019

(65) Prior Publication Data

US 2020/0067062 A1 Feb. 27, 2020

Related U.S. Application Data

(62) Division of application No. 15/719,452, filed on Sep. 28, 2017, now Pat. No. 10,497,920.

(30) Foreign Application Priority Data

May 12, 2017 (KR) .......................... 10-2017-0058979

(51) Int. Cl.
*H01M 2/20* (2006.01)
*H01M 2/10* (2006.01)
(Continued)

(52) U.S. Cl.
CPC ......... *H01M 50/502* (2021.01); *H01M 50/20* (2021.01); *H01M 2220/20* (2013.01)

(58) Field of Classification Search
CPC combination set(s) only.
See application file for complete search history.

(56) References Cited

U.S. PATENT DOCUMENTS 6,361,897 B1 * 3/2002 Snyder .................... H01M 2/20
429/178
9,362,261 B2 6/2016 Tokuyama et al.
(Continued)

FOREIGN PATENT DOCUMENTS

JP 2015-199435 A 11/2015
KR 10-2011-0060134 A 6/2011
(Continued)

OTHER PUBLICATIONS

U.S. Notice of Allowance dated Aug. 14, 2019 issued in U.S. Appl. No. 15/719,452.

*Primary Examiner* — Kaity V Chandler
(74) *Attorney, Agent, or Firm* — Morgan, Lewis & Bockius LLP

(57) ABSTRACT

Disclosed is a battery system, including: a plurality of battery modules provided in a space formed between an upper casing and a lower casing; connection busbars respectively connected to terminals of the battery modules; an intermediate busbar connected to the connection busbars such that the connection busbars are electrically connected to each other; and an insulation protector provided with opposite end portions attached to the upper casing, and with a holding portion placed below the intermediate busbar at a position between the opposite end portions.

3 Claims, 8 Drawing Sheets

(51) Int. Cl.
  *H01M 50/502* (2021.01)
  *H01M 50/20* (2021.01)

(56) References Cited

U.S. PATENT DOCUMENTS

| | | | |
|---|---|---|---|
| 2012/0068668 A1* | 3/2012 | Kittell | B60L 53/11 |
| | | | 320/162 |
| 2012/0100399 A1 | 4/2012 | Adachi et al. | |
| 2012/0129022 A1 | 5/2012 | Kalish et al. | |
| 2012/0305283 A1 | 12/2012 | Kalayjian et al. | |
| 2013/0052515 A1 | 2/2013 | Park et al. | |
| 2013/0130071 A1 | 5/2013 | Adachi et al. | |
| 2013/0260212 A1 | 10/2013 | Kohno et al. | |
| 2013/0288530 A1* | 10/2013 | Zhao | H01M 10/425 |
| | | | 439/627 |
| 2013/0330594 A1 | 12/2013 | Soleski et al. | |
| 2014/0011058 A1 | 1/2014 | Adachi et al. | |
| 2014/0030563 A1 | 1/2014 | Hoshi et al. | |
| 2014/0065885 A1 | 3/2014 | Nakayama | |
| 2014/0158396 A1 | 6/2014 | Nakayama | |
| 2014/0256178 A1 | 9/2014 | Kinoshita et al. | |
| 2014/0305698 A1* | 10/2014 | Ishikawa | H01M 2/206 |
| | | | 174/72 B |
| 2014/0329136 A1 | 11/2014 | Kinoshita et al. | |
| 2015/0069829 A1 | 3/2015 | Dulle et al. | |
| 2015/0104675 A1 | 4/2015 | Mishiro et al. | |
| 2015/0140367 A1* | 5/2015 | Yagi | H01M 2/204 |
| | | | 429/50 |
| 2015/0214532 A1 | 7/2015 | Nakayama et al. | |
| 2015/0214534 A1 | 7/2015 | Callicoat et al. | |
| 2015/0231975 A1 | 8/2015 | Ishii et al. | |
| 2015/0357620 A1* | 12/2015 | Nakayama | H01M 2/206 |
| | | | 429/90 |
| 2016/0036032 A1 | 2/2016 | Zhang et al. | |
| 2016/0036088 A1 | 2/2016 | Tononishi | |
| 2016/0093855 A1 | 3/2016 | Tononishi | |
| 2016/0093862 A1 | 3/2016 | DeKeuster et al. | |
| 2016/0099583 A1* | 4/2016 | Zanoni | H01M 10/425 |
| | | | 429/7 |
| 2016/0197321 A1 | 7/2016 | Tyler et al. | |
| 2016/0204463 A1 | 7/2016 | Lee et al. | |
| 2016/0226036 A1* | 8/2016 | Kim | H01M 2/1072 |
| 2016/0254515 A1* | 9/2016 | Shimoda | H01M 2/206 |
| | | | 429/61 |
| 2016/0344011 A1* | 11/2016 | Ogawa | H01M 2/206 |
| 2017/0005319 A1 | 1/2017 | Rong | |
| 2017/0062782 A1 | 3/2017 | Cho et al. | |
| 2017/0170439 A1 | 6/2017 | Jarvis et al. | |
| 2017/0222200 A1* | 8/2017 | Murai | H01M 2/1077 |
| 2017/0244076 A1 | 8/2017 | Yuasa et al. | |
| 2017/0256826 A1 | 9/2017 | Hong et al. | |
| 2018/0034014 A1* | 2/2018 | Ichikawa | H01M 2/12 |
| 2018/0097322 A1* | 4/2018 | Harris, III | H01R 25/162 |

FOREIGN PATENT DOCUMENTS

| | | |
|---|---|---|
| KR | 10-1104002 B1 | 1/2012 |
| KR | 10-2014-0015252 A | 2/2014 |

\* cited by examiner

BATTERY SYSTEM

CROSS REFERENCE TO RELATED APPLICATION

The present application is a divisional patent application of U.S. patent application Ser. No. 15/719,452, filed Sep. 28, 2017, which claims priority to Korean Patent Application No. 10-2017-0058979, filed May 12, 2017, the entire contents of which are incorporated herein for all purposes by this reference.

BACKGROUND OF THE INVENTION

Field of the Invention

The present invention relates generally to a battery system. More particularly, the present invention relates to a battery system in which when a high-voltage battery is mounted in or removed from a vehicle, or when servicing such as inspection or repair of the high-voltage battery is performed, a safety accident can be prevented by blocking an electrical connection between battery modules in the high-voltage battery.

Description of the Related Art

Recently, high-voltage batteries or high-capacity batteries are used in a hybrid vehicle and an electric vehicle, and safety measures including control measures and physical measures are required for their safe management and handling. As part of the physical measures of the safety measures, a service plug is provided in a casing of a high voltage battery.

The service plug is used to physically shut off the entire high voltage in the high voltage battery. The service plug is used in all high voltage batteries, and depending on the company, is called by various names such as safety plug, service plug, disconnect switch, etc.

The service plug is configured such that when the high-voltage battery is assembled or disassembled, a serial connection middle part of the high-voltage battery is electrically opened, thereby securing operator's safety. In addition, if a fuse is mounted in the service plug, it is possible to prevent a secondary accident caused by an electric short (short circuit).

On the other hand, since a high-voltage battery mounted in an eco-friendly vehicle including a hybrid vehicle, an electric vehicle, and a fuel cell vehicle is cooled by a water cooling method, an airtight casing is required. The airtight casing is configured to maintain airtightness, so it is difficult to mount the service plug therein and the service plug may be omitted. Accordingly, there is a problem in that possibility of a safety accident may increase.

Moreover, since production cost of the service plug is high, it may be omitted for cost reduction, thereby increasing the possibility of the safety accident.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a battery system, in which when servicing of a high-voltage battery of a vehicle is performed, a safety accident involving a high-voltage battery is prevented by blocking an electrical connection between battery modules included in the high-voltage battery.

In order to achieve the above object, according to one aspect of the present invention, there is provided a battery system, including: a plurality of battery modules provided in a space formed between an upper casing and a lower casing; connection busbars respectively connected to terminals of the battery modules; an intermediate busbar connected to the connection busbars such that the connection busbars are electrically connected to each other; and an insulation protector provided with opposite end portions attached to the upper casing, and with a holding portion placed below the intermediate busbar at a position between the opposite end portions.

In the preferred embodiment of the present invention, the upper casing may include: an opening provided above an area where the connection busbars and the intermediate busbar are connected to each other; and a service cover covering the opening.

In the preferred embodiment of the present invention, the connection busbars and the intermediate busbar may be bolt-connected to each other.

In the preferred embodiment of the present invention, each of the connection busbars may include a connection groove, and the intermediate busbar is inserted into the connection groove.

In the preferred embodiment of the present invention, the intermediate busbar may be provided with a fuse at a position between portions of the intermediate busbar where the intermediate busbar is connected to the connection busbars.

In order to achieve the above object, according to another aspect of the present invention, there is provided a battery system, including: a plurality of battery modules provided in a space formed between an upper casing and a lower casing; connection busbars respectively connected to terminals the battery modules; and an intermediate busbar connected to the connection busbars such that the connection busbars are electrically connected to each other, wherein the upper casing includes: an opening provided above an area where the connection busbars and the intermediate busbar are connected to each other; and a service cover covering the opening, and the intermediate busbar is partially attached to a lower surface of the service cover.

In the preferred embodiment of the present invention, each of the connection busbars may include a connection groove, and the intermediate busbar is inserted into the connection groove.

In the preferred embodiment of the present invention, the intermediate busbar may be provided with a fuse at a position between portions of the intermediate busbar where the intermediate busbar is connected to the connection busbars.

According to the battery system having the above-configuration, servicing such as when the high-voltage battery is mounted in or removed from a vehicle, or inspection or repair of the high-voltage battery is required, the electrical connection between the battery modules included in the high-voltage battery can be blocked, whereby it is possible to prevent a safety accent involving the high-voltage battery.

In addition, according to the battery system, since the configuration capable of replacing a conventional service plug is simpler than the service plug and the configuration can be reduced in size, it is possible to achieve reduced production cost, easy securing of space, improved worker accessibility, and reduced working time.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
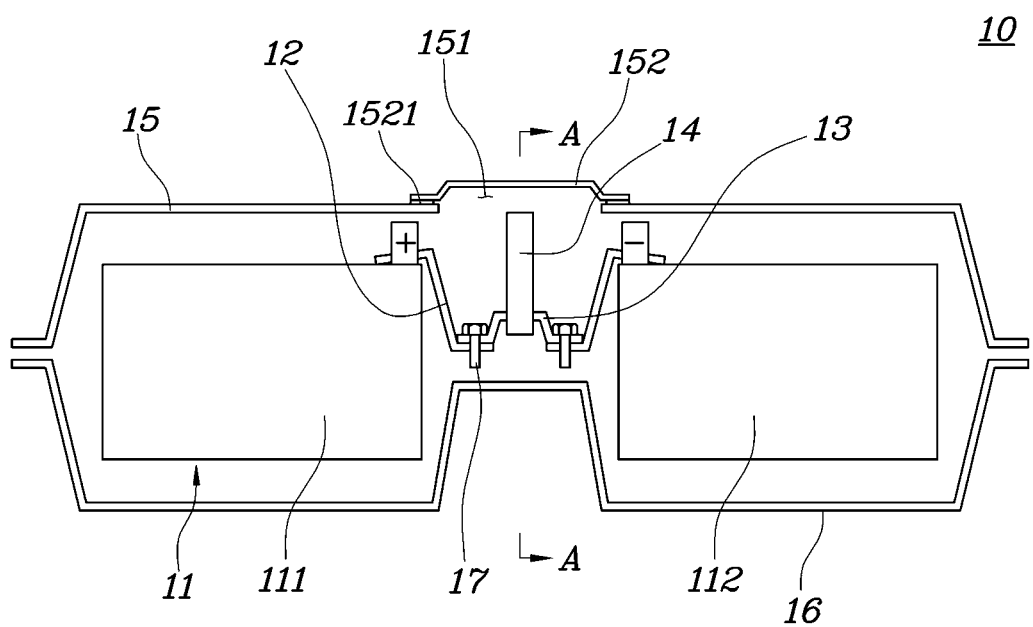
FIG. 1 is a perspective view showing a battery system according to an embodiment of the present invention.

Hereinbelow, a battery system according to exemplary embodiments of the present invention will be described in detail with reference to the accompanying drawings. Throughout the drawings, the same reference numerals will refer to the same or like parts. In particular, in the following description, a battery system used in a vehicle will be described as an example.

FIG. 1 is a perspective view showing the battery system according to an embodiment of the present invention.

Referring to FIG. 1, the battery system 10 includes a plurality of battery modules 11, connection busbars 12, an intermediate busbar 13, and an insulation protector 14.

The plurality of battery modules 11 may be provided in a space formed between an upper casing 15 and a lower casing 16. Generally, a battery system, particularly a high voltage battery system for driving a motor of a vehicle, is provided to provide a desired voltage or a desired amount of power by electrically connecting a plurality of battery modules in series or in parallel. These battery modules may have positive (+) and negative (−) terminals for electrical connection with the outside.

The upper casing 15 and the lower casing 16 form a space such that the battery modules 11 connected to each other and a connection structure therebetween are arranged in the space. The upper and lower casings 15 and 16 may be bonded to each other such that airtightness or watertightness with respect to the outside is maintained for protection of internal elements or water cooling and the like.

The connection busbars 12 may be respectively connected to positive (+) terminals or negative (−) terminals of the battery modules 11 such that the connection busbars 12 and the battery module 11 are electrically connected to each other.

A connection busbar 12 may have a plurality of bent portions in consideration of the arrangement of the battery modules 11, and the intermediate busbar 13 and the insulation protector 14 that will be described later. Here, a bent shape of the connection busbar 12 may be determined in consideration of operator workability.

The connection busbar 12 may be provided with a hole (not shown) into which a bolt 17 is inserted at a position where the connection busbar 12 is connected with the intermediate busbar 13.

Further, the connection busbar 12 may be made of a conductor including a metal to allow current flow with the plurality of battery modules 11 through the terminals.

The intermediate busbar 13 may be engaged at opposite ends thereof with the connection busbars 12 respectively connected to the battery modules 11 such that the connection busbars 12 are electrically connected to each other. Here, the intermediate busbar 13 may be provided with a hole (not shown) into which the bolt 17 fastening the connection busbar 12 and the intermediate busbar 13 to each other is inserted at a position where the intermediate busbar 13 is in physical contact with the connection busbar 12.

The intermediate busbar 13 may be engaged with the connection busbars 12 by various fastening members so as to be prevented from being separated from the connection busbars 12 by physical forces such as vibration, impact, and the like.

For example, as described above, one bolt 17 may be simultaneously connected to the holes formed in the connection busbar 12 and the intermediate busbar 13 such that electrical connection and physical connection are formed therebetween. In other words, a hole formed at a first end of the intermediate busbar 13 may be connected by one bolt to the hole of the connection busbar 12 connected to a terminal of one battery module 111, and a hole formed at a second end of the intermediate busbar 13 may be connected by another bolt to the hole of the connection busbar 12 connected to a terminal of the other battery module 112.

Although not shown in the drawings, each of the holes provided at the connection busbar 12 and the intermediate busbar 13 is provided with a thread (not shown) such that reliable fastening of the bolt 17 can be provided.

The intermediate busbar 13 may also be made of a conductor including a metal to enable current flow between the battery modules 11.

In addition, the intermediate busbar 13 may have a structure having a plurality of bent portions in consideration of an engagement structure with the insulation protector 14, which will be described later. Here, a bent shape of the intermediate busbar 13 may be determined in consideration of the engagement structure with the insulation protector 14.

The insulation protector 14 may be provided with opposite end portions attached to the upper casing 15, and with a holding portion 141 placed below the intermediate busbar 13 at a position between the opposite end portions. Here, the insulation protector 14 serves to secure the safety of the operator by opening the electrical connection between the plurality of battery modules 11 when the operator removes the upper casing 15.

The connection relationship between the insulation protector 14 and the upper casing 15 will be described in detail with reference to FIG. 2.

Figure 2:
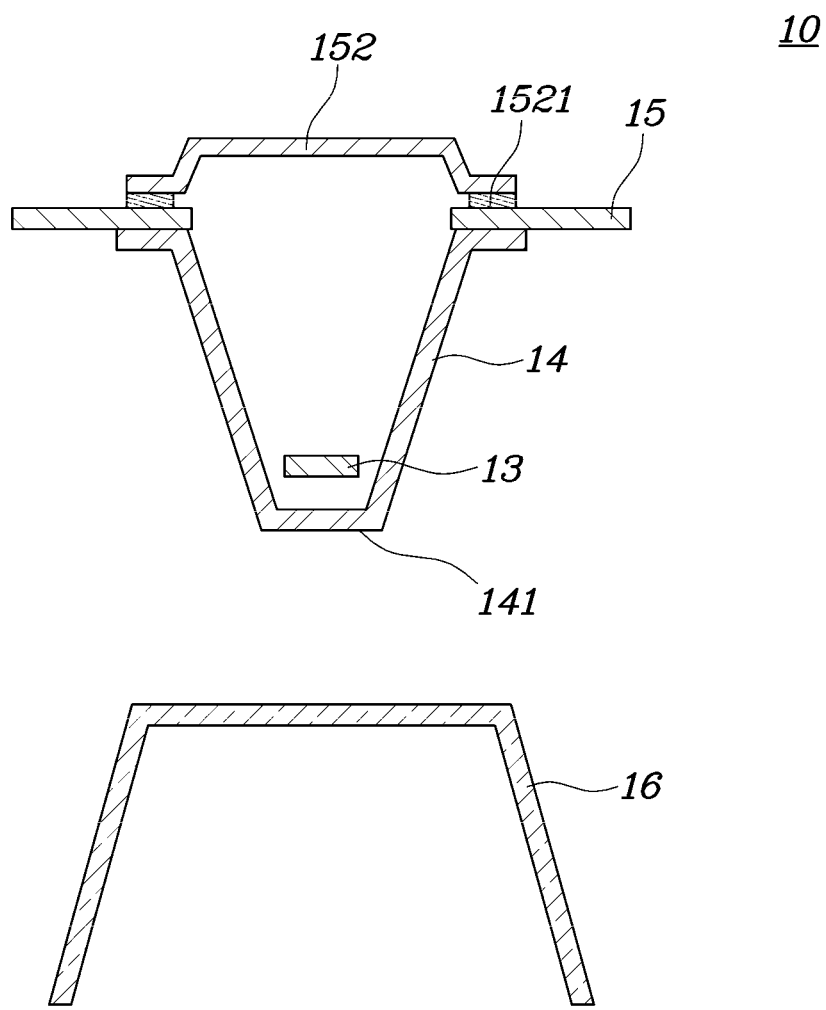
FIG. 2 is a cross-sectional view taken along line A-A of FIG. 1.

FIG. 2 is a cross-sectional view showing the battery system according to the embodiment of the present invention.

As shown in FIG. 2, the opposite end portions of the insulation protector 14 are fixedly attached to the upper casing 15, and the holding portion 141 placed between the opposite end portions of the insulation protector 14 is placed below a lower portion of the intermediate busbar 13. For example, when the upper casing 15 is detached and then moved up by the operator, the insulation protector 14 with the opposite end portions attached to the upper casing 15 is moved upward together with the intermediate busbar 13, and thus the intermediate busbar 13 can be separated by being held on the holding portion 141 of the insulation protector 14. Of course, since the connection busbars 12 and the intermediate busbar 13 are bolt-connected to each other, before removing the upper casing 15, the operator should remove the bolt 17 fastening the connection busbar 12 and the intermediate busbar 13 to each other.

As described above, for preliminary work such as removing the bolt 17 for fastening the connection busbar 12 and the intermediate busbar 13 to the upper casing 15, or various post work, the upper casing 15 may include: an opening 151 provided above an area where the connection busbars 12 and the intermediate busbar 13 are connected to each other; and a service cover 152 covering the opening 151.

The opening 151 may be provided such that the operator can easily access and operate the battery modules 11, the connection busbars 12, the intermediate busbar 13, or the bolt 17 from outside the casing.

The service cover 152 covering the opening 151 may be provided to ensure airtightness of a battery module seating space formed by the combination of the upper casing 15 and the lower casing 16. The service cover 161 may be attached and detached by the operator and may include an airtight (watertight) unit 1521, which is implemented as a hermetically sealed material such as an o-ring, silicone, resin, etc., thereby ensuring airtightness or watertightness in the casing.

Figure 3:
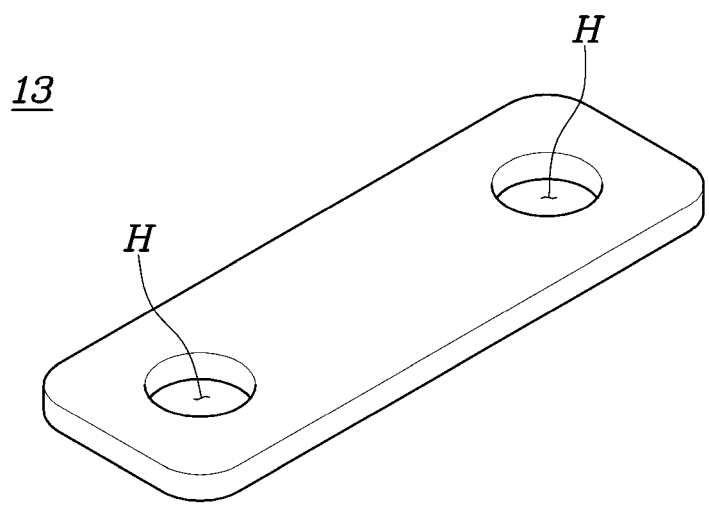
FIGS. 3 and 4 are perspective views showing examples of an intermediate busbar used in the battery system according to the embodiment of the present invention.
Figure 4:
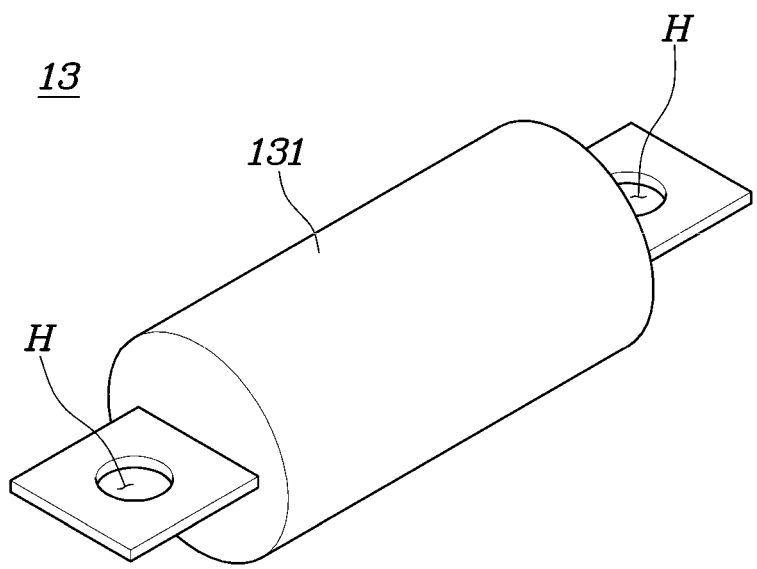

FIGS. 3 and 4 are perspective views showing examples of the intermediate busbar used in the battery system according to the embodiment of the present invention.

Referring to FIG. 3, the intermediate busbar 13 may be provided at opposite ends thereof with holes H into which bolts fastening the intermediate busbar 13 and the connection busbars 12 to each other are inserted, the opposite ends being in physical contact with the connection busbars 12, and the intermediate busbar 13 may be formed in a flat shape without having a bent portion between the opposite ends.

Referring to FIG. 4, the intermediate busbar 13 may be provided at opposite ends thereof with holes H into which bolts fastening the intermediate busbar 13 and the connection busbars to each other are inserted, the opposite ends being in physical contact with the connection busbars 12, and the intermediate busbar 13 may be provided with a fuse 131 at a position between the opposite ends.

Further, the intermediate busbar 13 may further include an insulation casing (not shown) covering the fuse 131 such that the fuse 131 is protected by securing insulation from outside.

As such, the intermediate busbar 13 may be formed in various shapes to facilitate engagement with the connection busbars 12.

Figure 5:
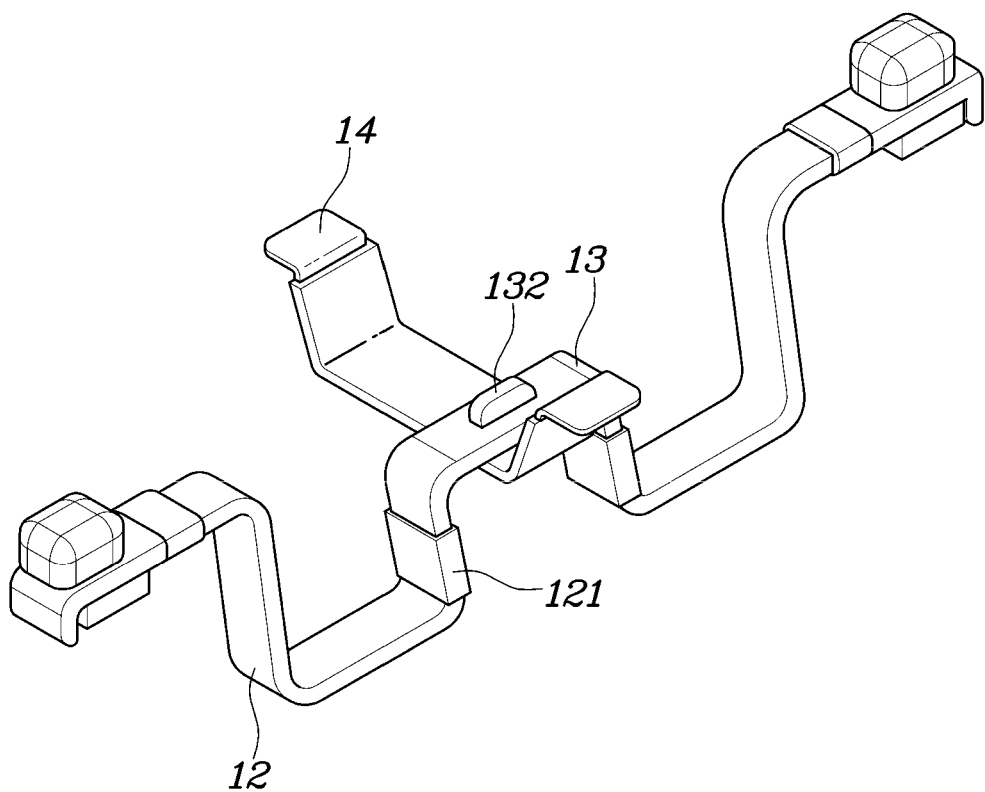
FIGS. 5 and 6 are a perspective view and a cross-sectional view showing a battery system according to another embodiment of the present invention.
Figure 6:
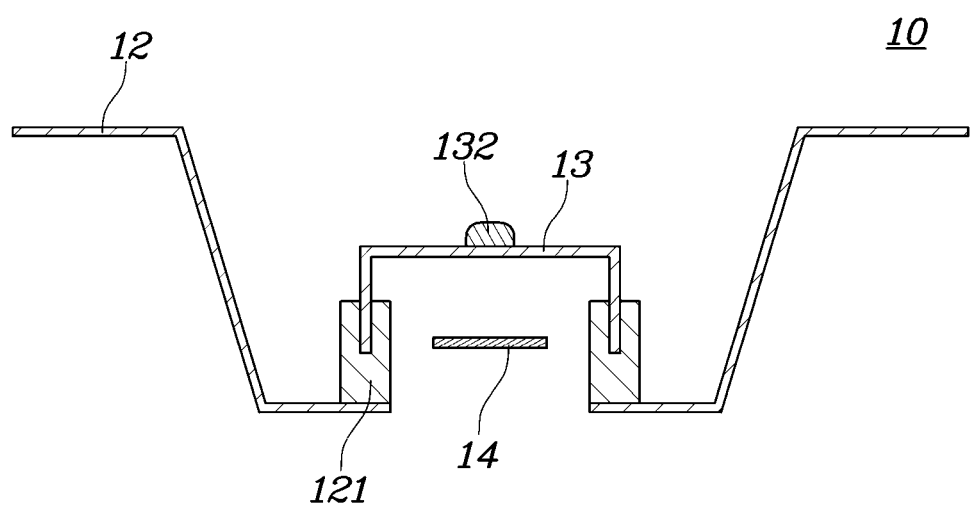

FIGS. 5 and 6 are a perspective view and a cross-sectional view showing a battery system according to another embodiment of the present invention.

The embodiment shown in FIGS. 5 and 6 is an embodiment in which the connection busbar 12 and the intermediate busbar 13 are modified in the battery system 10 of FIG. 1.

Referring to FIGS. 5 and 6, a connection busbar 12 of the battery system 10 may include a connection groove 121 protruding upward.

An intermediate busbar 13 may have a structure in which opposite ends thereof are bent downward and are inserted into connection grooves 121 of connection busbars 12. Here, the opposite ends of the intermediate busbar 13 may be formed in various shapes to be easily inserted into the connecting grooves 121.

In addition, the intermediate busbar 13 may be provided at an upper portion thereof with a protrusion 132. The protrusion 132 may be provided such that the operator can more easily handle the intermediate busbar 13 in the process of inserting/removing the intermediate busbar 13 into and from the connecting grooves 121 of the connection busbars 12.

The intermediate busbar 13 may further include an insulation casing (not shown) such that the protrusion 132 is protected by securing insulation from outside.

Figure 7:
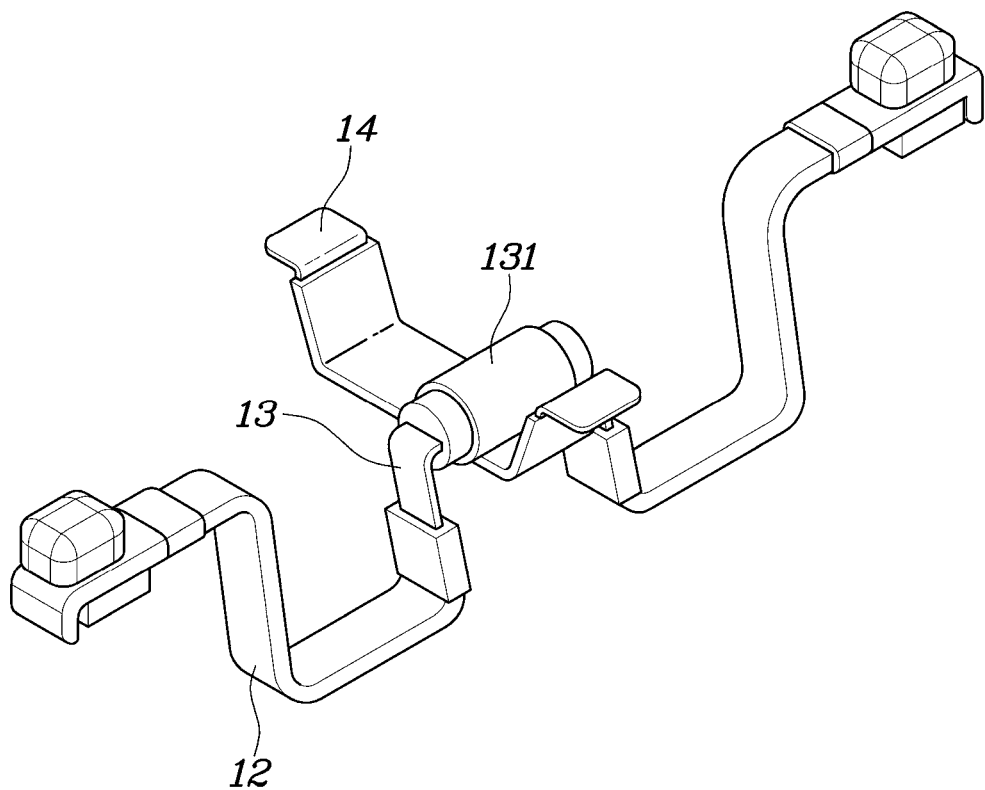
FIGS. 7 and 8 are a perspective view and a cross-sectional view showing a battery system according to a further embodiment of the present invention.
Figure 8:
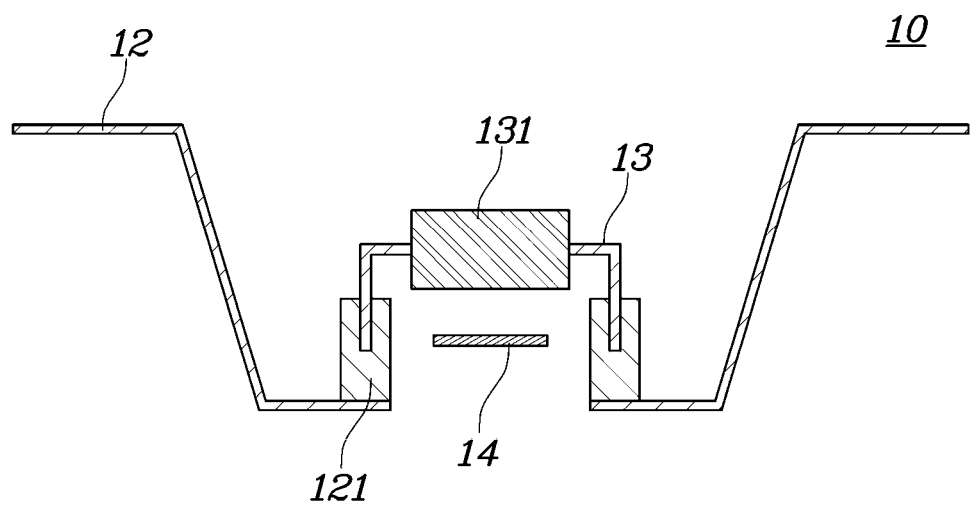

FIGS. 7 and 8 are a perspective view and a cross-sectional view of a battery system according to a further embodiment of the present invention.

The embodiment shown in FIGS. 7 and 8 is an embodiment in which the connection busbar 12 and the intermediate busbar 13 are modified in the battery system 10 of FIG. 1 similarly to the embodiment of FIG. 5 described above, and is an embodiment in which the intermediate busbar 13 is provided with the fuse 131.

Referring to FIGS. 7 and 8, a connection busbar 12 of a battery system 10 may include a connection groove 121 protruding upward, and an intermediate busbar 13 may be provided such that opposite ends thereof are bent downward and are inserted into connection grooves 121 of connection busbars 12.

In this embodiment, the intermediate busbar 13 is provided with a fuse 131 at a position between the opposite ends such that overcurrent can be blocked.

In addition, the intermediate busbar 13 may further include an insulation casing (not shown) such that the fuse 131 is protected by securing insulation from outside.

Figure 9:
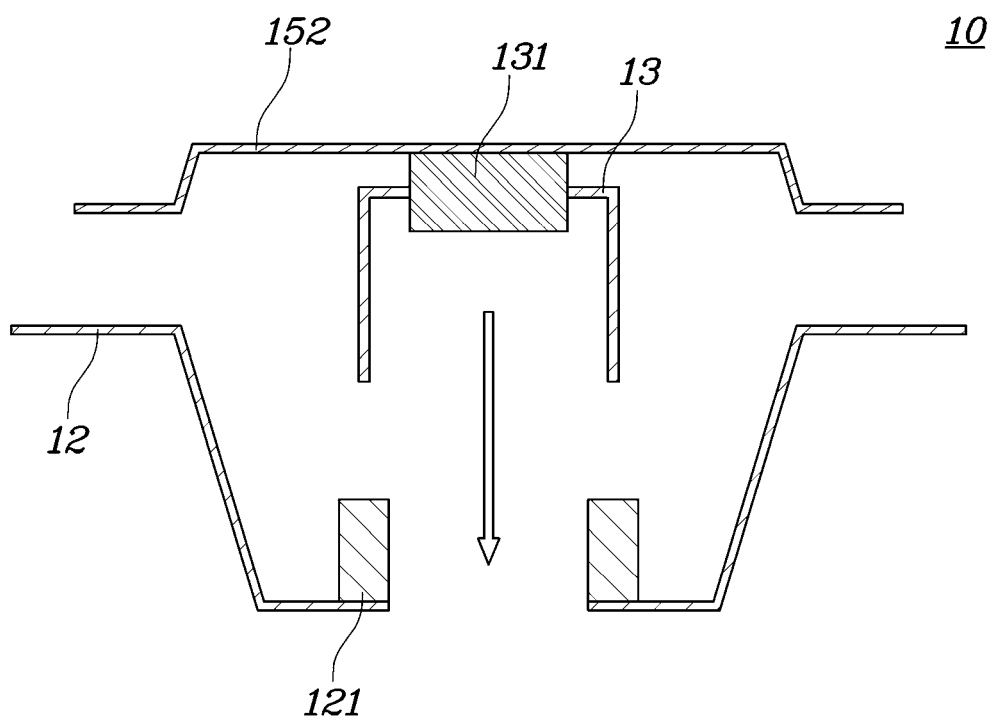
FIG. 9 is a cross-sectional view showing a battery system according to yet another embodiment of the present invention.

FIG. 9 is a cross-sectional view showing a battery system according to yet another embodiment of the present invention. FIG. 9 shows an embodiment in which the insulation protector used in the embodiments described in FIGS. 1 to 8 is omitted and the intermediate busbar is directly fixed to the service cover.

Referring to FIG. 9, a battery system 10 may include a plurality of battery modules 11, connection busbars 12, and an intermediate busbar 13.

The plurality of battery modules 11 may be arranged in a space formed between the upper casing 15 and the lower casing 16, and the connection busbars 12 may be respectively connected to terminals of the battery modules 11. Here, a connection busbar 12 may be implemented as a structure including a connection groove 121.

Opposite ends of the intermediate busbar 13 may be inserted into connection grooves 121 formed at two connection busbars 12, respectively, such that an electrical connection can be formed between two battery modules 111 and 112.

The intermediate busbar 13 may be provided with a fuse 131 at a position between portions thereof where the intermediate busbar 13 is connected to the connection busbars 12.

In addition, the intermediate busbar 13 may further include an insulation casing (not shown) such that the fuse 131 is protected by securing insulation from outside.

In particular, in the embodiment of FIG. 9, the intermediate busbar 13 may be implemented such that the intermediate busbar 13 is fixed to a lower surface of the service cover 152. As described in the embodiment shown in FIG. 1, the upper casing 15 may include the opening 151 provided above the area where the connection busbars 12 and the intermediate busbar 13 are connected to each other, and the service cover 152 covering the opening 151, and the intermediate busbar 13 may be partially attached to the lower surface of the service cover 152.

When the operator removes the service cover 152, the intermediate busbar 13 formed integrally with the service cover 152 can be removed together with the service cover 152 by being separated from the connection grooves 121 of the connection busbars 12. On the contrary, even when the service cover 152 covering the opening 151 is assembled with the intermediate busbar 13, the intermediate busbar 13 and the connection busbars 12 can be engaged with each other through the assembly of the service cover 152 without requiring an assembly process of the intermediate busbar 13.

In this embodiment, since the service cover 152 and the intermediate busbar 13 are integrally formed with each other, it is possible to omit engagement/separation operation of the intermediate busbar 13 and the connection busbars 12 through the opening 151 required in other embodiments, and thus the engagement/separation operation of the intermediate busbar 13 and the connection busbars 12 can be safely performed.

As described above, the battery system according to the embodiments of the present invention can prevent a safety accident caused by a short circuit without using a service plug during a service operation of a high voltage battery of a vehicle.

In particular, the battery system according to the embodiments of the present invention can replace a conventional service plug with a simpler and smaller structure, thereby reducing cost of a final product and improving operator workability.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery system, comprising:
   a plurality of battery modules provided in a space formed between an upper casing and a lower casing;
   connection busbars respectively connected to terminals of the plurality of battery modules; and
   an intermediate busbar connected to the connection busbars such that the connection busbars are electrically connected to each other,
   wherein the upper casing includes: an opening provided above an area where the connection busbars and the intermediate busbar are connected to each other; and a service cover covering the opening, and the intermediate busbar is partially attached to a lower surface of the service cover.

2. The battery system of claim 1, wherein each of the connection busbars includes a connection groove, and the intermediate busbar is inserted into the connection groove.

3. The battery system of claim 1, wherein the intermediate busbar is provided with a fuse at a position between portions of the intermediate busbar where the intermediate busbar is connected to the connection busbars.

* * * * *